Figure 1:
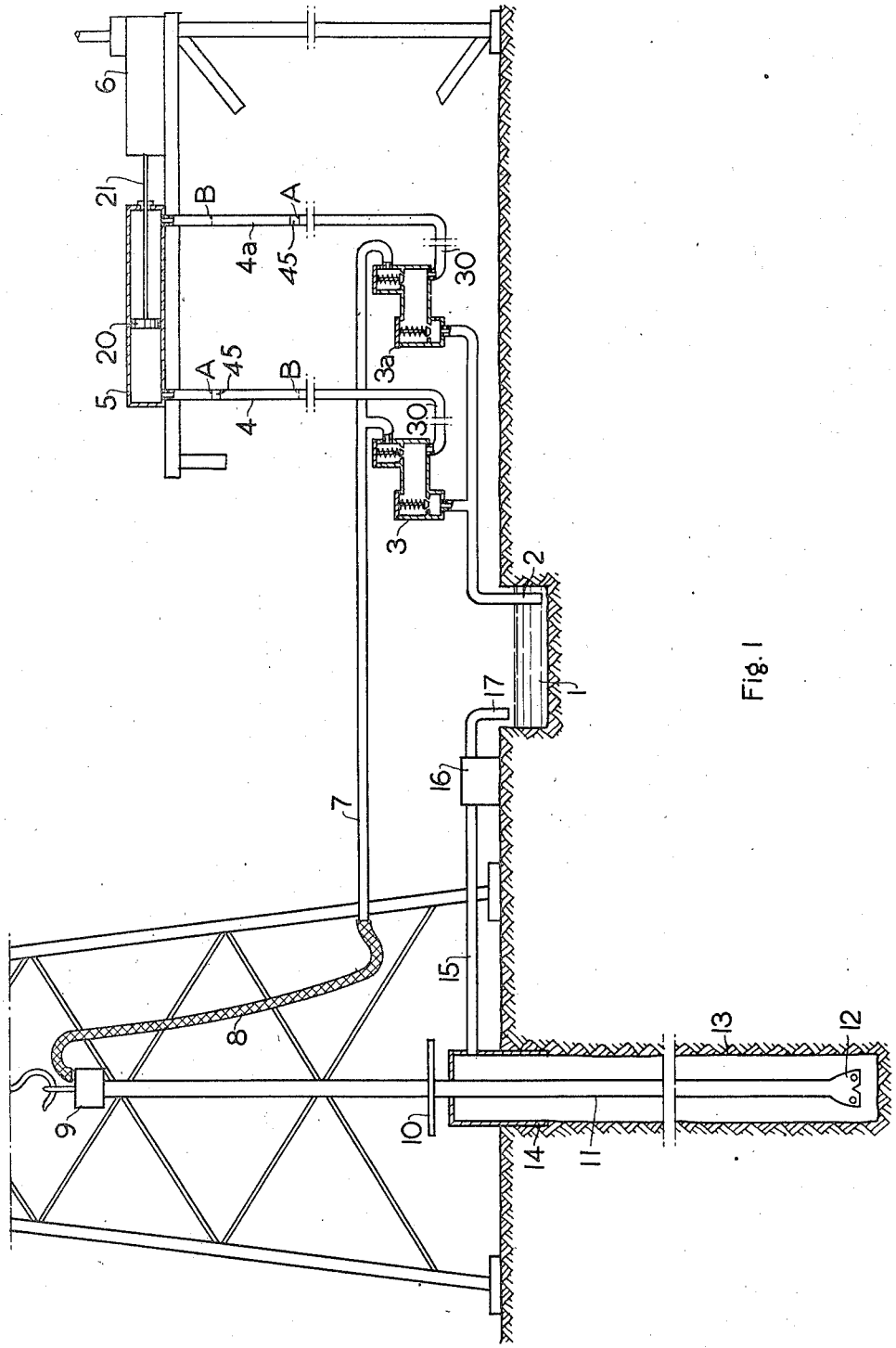

Inventor: Nelson W. Thompson
By his Attorney

Aug. 12, 1941.  N. W. THOMPSON  2,252,050
APPARATUS FOR CIRCULATING DRILLING FLUIDS
Filed Sept. 30, 1939  2 Sheets-Sheet 2
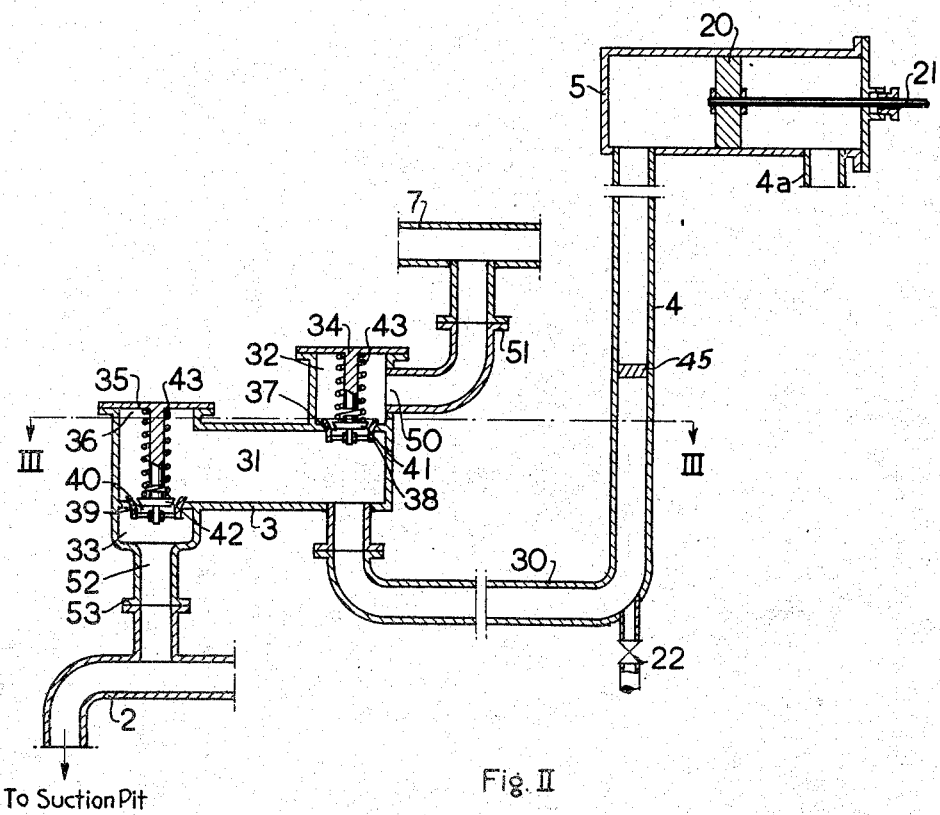
Fig. II
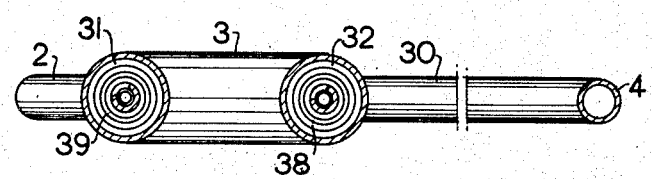
Fig. III
Inventor: Nelson W. Thompson
By his Attorney:

Patented Aug. 12, 1941

2,252,050

UNITED STATES PATENT OFFICE 2,252,050

APPARATUS FOR CIRCULATING DRILLING FLUIDS

Nelson W. Thompson, Oakland, Calif., assignor to Shell Development Company, San Francisco, Calif., a corporation of Delaware Application September 30, 1939, Serial No. 297,328

1 Claim. (Cl. 103—165)

The present invention relates to oil wells and pertains more particularly to apparatus for circulating drilling fluids therein.

In the process of drilling oil wells, it is customary to circulate a colloidal suspension of clay, to which may be added weighting materials, such as iron oxides, barytes, and the like, usually down the drill pipe, out through the drill bit, and back up through the casing (or in the opposite direction in so-called reverse circulation drilling), in order to carry drill bit cuttings to the surface and to prevent wells traversing high pressure strata from blowing out.

Reciprocating pumps of the piston or plunger type are commonly used to circulate the drilling fluid between its source of supply and the well. Due, however, to the strongly abrasive action of particles of clay, weighting materials and ground cuttings in the drilling fluid, the cylinders of said pumps soon become heavily scored, and, in particular, the packing on said pump cylinders and pistons is rapidly disintegrated, making it impossible to maintain the desired pressures and necessitating costly shut-downs and repairs.

It is, therefore, an object of this invention to provide a drilling fluid circulation system in which a column of non-abrasive fluid, such as clean oil, is interposed between the pump and the conduit conveying the drilling fluid from its source of supply to the well head, thereby preventing scoring of the pump and deterioration of the packing.

It is also an object of this invention to provide a drilling fluid circulation system comprising valved flow-directing devices located at a considerably lower level than the drilling fluid pump, whereby a non-abrasive fluid may be maintained in the pump and in the conduits between said pump and said devices above the drilling fluid filling the rest of the system and having a greater specific gravity than said non-abrasive fluid.

It is also an object of this invention to provide a drilling fluid circulating system wherein floating means having a specific gravity greater than the non-abrasive fluid filling one portion of the circulating system and less than the drilling fluid filling the remaining portion of the circulating system is interposed at the interface between said two fluids to prevent their becoming intermingled.

Further objects and advantages will be apparent from the following description taken with reference to the drawings, wherein:

Figure I is a diagrammatic view of a drilling rig and a drilling fluid circulating system.

Figure II is an enlarged vertical sectional view of a portion of the drilling fluid circulation system of the present invention.

Figure III is a cross-sectional view along the line III—III of Figure II.

Referring to Figure I of the drawings, drilling fluid is withdrawn from the suction pit I through suction line 2 into valved flow-directing devices or casings 3 and 3a and forced out of said devices by means of oscillating columns of liquid in upright pipes 4 and 4a connected to a pump 5 as hereinafter will be more fully described. The pipes 4 and 4a communicate between said devices and the piston or plunger pump 5, disposed at a considerably higher level than said devices and having associated therewith reciprocating prime-mover means, such as diagrammatically shown at 6. The prime-mover 6 may be of any suitable type and, for example, when operatively associated with two piston cylinders, it may be of the duplex double acting type. The reciprocation of the piston 20 by means of the piston rod 21 causes liquid in the cylinder 5 and in the upright pipes 4 and 4a connected near each end thereto and on opposite sides of the piston 20 to be oscillated, that is alternately displaced in opposite direction. However, it is understood that any other suitable means for oscillating a column of liquid in an upright pipe will suffice for the purpose of the present invention.

The oscillating columns in pipes 4 and 4a cause the drilling fluid to be forced from the devices 3 and 3a through pressure line 7 to the flexible hose 8, through the swivel 9 and down the drill stem 11, which is driven by the rotary table 10. After passing out of the drill bit 12, the drilling fluid with suspended drill bit cuttings flows upwards through the borehole 13 out through the surface casing 14 through line 15 to a vibrating screen 16 for removal of the cuttings and is then discharged through line 17 into the suction pit 1.

Now referring to the more detailed Figures II and III of the pumping system, the lower end of the upright pipe 4 may be provided with a valved drain line 22 and is connected, preferably, by means of a U-bend 30, to the lower portion of a passage 31 in a preferred embodiment of the valved flow-controlling device or casing 3. Located above the passage 31 is a pressure chamber 32, and located below the pump passage 31 is a suction chamber 33. A cover 34 closes the top of the pressure chamber 32 and a cover 35 closes an opening 36 in the upper wall of the pump passage 31, which is over the suction chamber 33. An opening 37, preferably fitted with a removable valve seat 38, connects the pressure chamber 32 with the pump passage 31, and an opening 39, fitted with a removable valve seat 40, if desired, also connects the suction chamber 33 with the pump passage 31. In valve seats 38 and 40 valves 41 and 42, respectively, are normally seated. These valves may be of any suitable type and of compositions normally used in mud pumps. For example, as shown, they may be of the wing-guided type, which are held against the seats by springs 43 carried by the covers 34 and 35.

Opening 50 provided with flange 51 and opening 52 with flange 53 are provided in the pressure chamber 32 and the suction chamber 33, respectively, and are connected to the pressure line 7 and the suction line 2, respectively.

The operation of the above-described embodiment of the present invention is as follows:

The entire interior of the pump passage 31, the U-bends 30, and about half way up the upright pipes 4 and 4a are filled with drilling fluid which may conveniently be accomplished by feeding drilling fluid under slight pressure through the suction line 2. The upper portions of the pipes 4 and 4a and the entire interior of the pump cylinder 5 are filled with a suitable fluid, preferably non-abrasive, such as clean oil or other fluid preferably immiscible with and having a specific gravity less than the drilling fluid which it is desired to circulate. The piston rod 21 and piston 20 attached thereto are then reciprocated by means of the prime-mover 6. This causes the contents of each end of the cylinder 5 to be alternately diminished and increased and thereby forces the oil in and out of the upright pipes 4 and 4a, which in turn forces the drilling fluid in the lower portion of the pipes 4 and 4a and U-bends 30 in and out of the pump passage 31. Thus, the suction stroke for the fluid in pipe 4 is the pressure stroke for the fluid in pipe 4a and, for example, when the interface between the oil and drilling fluid is at A in pipe 4, the interface is at A in pipe 4a; the positions of the interfaces changing to points B on the reverse stroke of the piston 20.

This oscillating motion of the liquid column in pipes 4 and 4a is transmitted to the pump passages 31 of the valve bodies 3 and 3a. Hence, for example on the suction stroke, that is movement of the liquid interface towards position A in pipe 4, a vacuum is caused in the pump passage 31 so that drilling fluid from the suction chamber 33 is drawn into the passage 31 through the opening 39, the valve 42 lifting from its seat 40 against the spring 43 to allow this. On the pressure stroke, that is, movement of the liquid interface to position B, the valve 42 is forced by spring 43 into its seat 40, closing the opening 39, and drilling fluid in the pump passage 31 is forced into the pressure chamber 32, through the opening 37, the valve 41 lifting from its seat 38 to allow this. Thus, the oscillating motion of the column of oil causes drilling fluid to be drawn from the suction pit 1 through the suction line 2 and suction manifold into the passage 31 and to be forced from said passage 31 into the pressure manifold and pressure line 7 and on into the well and then back to the pit 1.

Although the oil in the upper portion of the pipes 4 and 4a is generally prevented from mixing with the drilling fluid in contact therewith due to the difference in specific gravity, mixing may further be avoided by inserting a floating ball or piston 45 of a specific gravity greater than that of the non-abrasive liquid and less than that of the drilling fluid at the interface of said fluids in the pipes 4 and 4a.

Particular importance is attached to the feature of the upright pipes 4 and 4a being connected through a U-band to the lowermost portion of the pump passage 31 as this arrangement tends to prevent gas from getting into the cylinders 5, which would cut down the capacity and efficiency of the pump.

It is likewise preferable that the height of the upright pipes 4 and 4a be such as to have a volume about twice that of the volume of the piston cylinder in order to avoid the possibility of clean oil being forced around the U-bends 30 into the passage 31 and being mixed with the drilling fluid.

I claim as my invention:

In a drilling fluid circulation system comprising conduit means between a supply of drilling fluid and the well head, two one-way valves in said conduit permitting fluid flow from said supply to said well head, a reciprocating pump disposed at a higher level than said valves, a second conduit in fluid communication between said pump and said first conduit at a point intermediate said two valves, a substantial portion of said second conduit extending in a vertical direction, said pump and a portion of the second conduit adjacent said pump being filled with a non-abrasive fluid, having a lower specific gravity than the drilling fluid filling the remaining portions of the circulation system, floating means within said second conduit adapted to separate said two fluids, said floating means having a specific gravity greater than that of the non-abrasive fluid but less than that of the drilling fluid, and prime-mover means to oscillate said fluid by reciprocating the pump piston.

NELSON W. THOMPSON.